INVENTORS
*KOJI NODA*
*MASARU HASHIMOTO*

BY *Mullin and Siegel*

ATTORNEYS

March 10, 1970  KOJI NODA ET AL  3,499,645
COPYING MACHINE PACK HOLDER

Filed May 22, 1968  4 Sheets-Sheet 3

INVENTORS
*KOJI NODA*
*MASARU HASHIMOTO*

BY *Mullin and Siegel*

ATTORNEYS

INVENTORS.
KOJI NODA
MASARU HASHIMOTO

BY Mullin and Siegel

ATTORNEYS

United States Patent Office 3,499,645
Patented Mar. 10, 1970

3,499,645
COPYING MACHINE PACK HOLDER
Koji Noda, Sakai, and Masaru Hashimoto, Kishiwada, Japan, assignors to Minolta Camera Kabushiki Kaisha, Osaka, Japan, a corporation of Japan
Filed May 22, 1968, Ser. No. 731,078
Claims priority, application Japan, May 23, 1967, 42/43,311, 42/43,312
Int. Cl. B65h 1/00; A47b 51/00
U.S. Cl. 271—61                    4 Claims

ABSTRACT OF THE DISCLOSURE

A copying machine having a copying paper storing means automatically movable between an operative position ready for copying operation and a withdrawn position ready for loading and replacement of the copying paper. An indexing means is provided to register the copying paper properly with respect to other parts of the copying machine. Indicator lamp means can be mounted on the copying machine to indicate the availability of the copying paper as well as the size thereof placed on the storing means.

This invention relates to a copying machine, and more particularly to a copying machine having an automatic copying paper storing device. The automatic copying paper storing device can provide an empty signal if no copying paper is stored therein ready for feeding, and automatically feeds the copying paper sheet by sheet toward the succeeding portion of the copying machine, responsive to each feed order signal applied thereto.

There are known copying machines in which copying paper is fed automatically sheet by sheet from a built-in copying paper storing means, so that a desired number of copies can be produced automatically from an original by overlaying the thus fed copying paper on the original in succession. Such known copying machines are of rotary mimeographic type, hectographic type, anastatic type, blue print type, etc. The built-in copying paper storing means of such known copying machines is generally fixed to the machine as an integral part thereof, and hence, has a disadvantage in that when copying papers of different sizes are used, the operator has to remember the size of the copying paper stored therein or check the size before starting the copying operation.

Therefore, an object of the present invention is to provide a copying machine capable of storing and replacing the copying paper in a very simple manner, while giving signals representing the information of the size of the copying paper stored therein. In order to fulfill such object, a preferred embodiment of the copying machine, according to the present invention, includes a copying paper storing board withdrawable out of the body of the copying machine for loading and replacing copying paper thereon. Upon placing the copying paper on the storing board, the board is adapted to be set at a predetermined operative position in the copying machine. The copying paper storing board, usable in the copying machine of the present invention, can provide positive and clear indication of the size of the copying paper held thereon, so that the operator can be sure of the copying paper size without memorizing it or inspecting the inside of the copying machine.

Other objects and a fuller understanding of the present invention may be had by referring to the following description, taken in conjunction with the accompanying drawings, in which.

Like parts are designated by like numerals and like symbols throughout the drawings.

Figure 1:
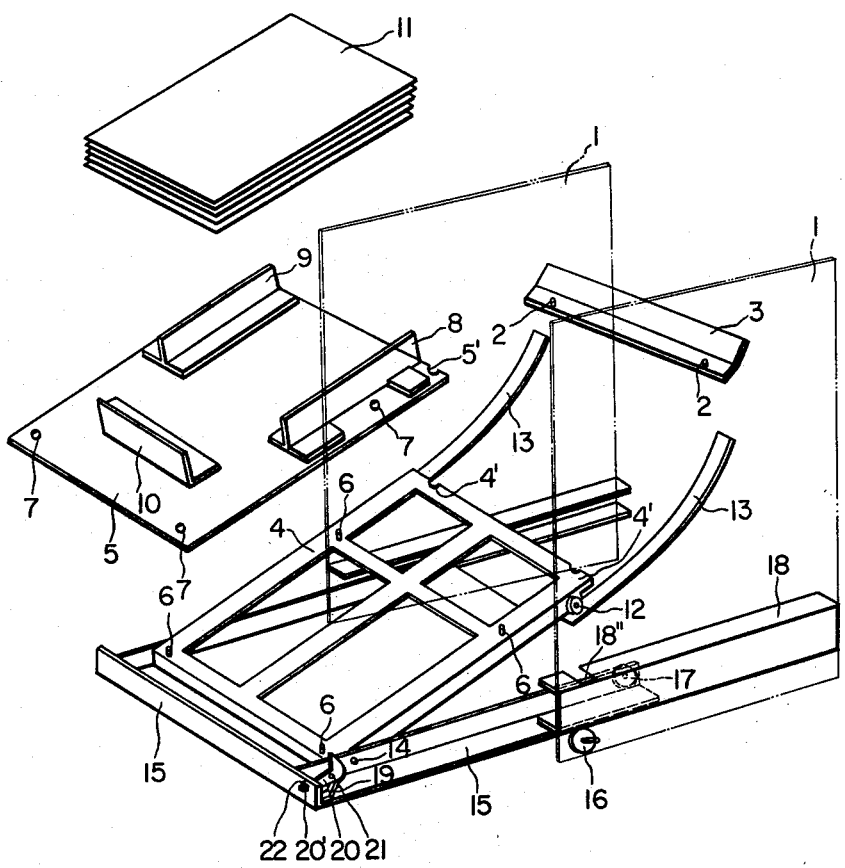
FIG. 1 is an eploded perspective view of a copying paper storing means, usable in the copying machine according to the present invention.

Referring to FIG. 1, copying machine side plates 1 has a copying paper guide plate 3 integrally secured thereto, and a pair of pins 2 projecting from the guide plate 3 for registering a copying paper storing board 5 and a holder 4 thereof. The storing board 5 is held by the holder 4 in registration therewith by fitting pins 6 secured to the holder into the corresponding holes 7 bored on the storing board 5. Notches 4' and 5' are formed on the holder 4 and the storing board 5, respectively, so that both the holder and the storing board are properly registered with the guide plate 3 by fitting the pins 2 secured to the guide plate 3 in the notches 4' and 5'.

Indexing plates 8, 9, and 10 are slidably mounted on the storing board 5, so as to index copying papers 11 of different sizes in position. The copying paper placed in position on the storing board 5 is fed to the succeeding portion of the copying machine by a suitable feeding device (not shown). A pair of rollers 12 are pivoted at the upper end of the holder 4, so as to roll along holder guide plates 13 secured to the side walls 1. The lower end of the holder 4 is pivotally connected to a slider 15 by a shaft 14 secured thereto. A pair of guide channels 18 are secured to the side walls 1, to facilitate withdrawal and insertion of the slider 15 with respect to the copying machine. Rollers 16 pivotally mounted on the side walls 1 and other rollers 17 at the tip of the slider 15 acts to insure smooth movement of the slider 15 along the guide channels 18.

Figure 2:
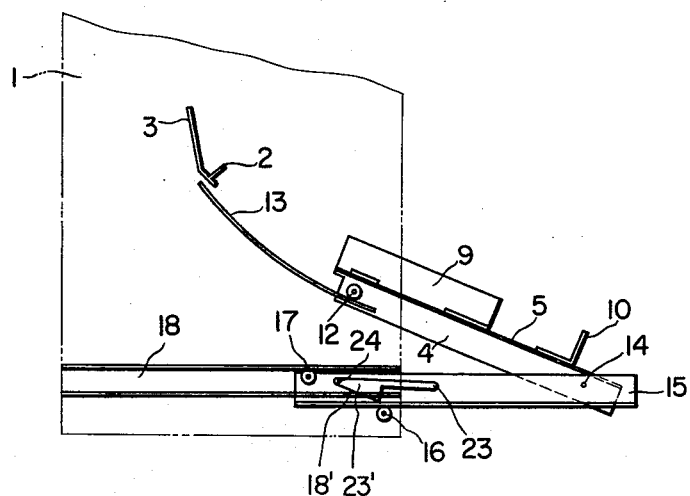
FIG. 2 is a partial side view of the essential portion of the copying paper storing board, shown in the state as withdrawn from the copying machine.

A lock claw 20 is pivoted to the slider 15 by a pin 21 at the outer end thereof, and a leaf spring 19 is inserted between the claw 20 and the slider 15 to bias the claw 20 counter-clockwise, as seen in the figure. One end 20' of the claw is elongated and extends to the outside of the slider 15 through an opening 22 bored on the outer edge wall of the slider 15, while the opposite end of the claw is engageable with a notch 18" formed on the guide channel 18 for locking the slider at the pushed-in or the operative position. A stopper 23 is pivoted to the slider 15 by another pin 24 at the inner end thereof, and the stopper 23 is biased clockwise by its own weight, so that a downward projection 23' of the stopper can fit in another notch 18' formed on the lower edge of the guide channel 18 when the slider 15 is fully withdrawn from the copying machine, as best shown in FIG. 2. When the slider 15 is withdrawn, gravitational forces acting on various parts secured to the slider 15 act to urge the slider 15 rightward, as seen in FIG. 2. The engagement of the projection 23' of the stopper 23 and the notch 18' of the channel 18 holds the slider 15 against such action of the gravity. Thereby, the slider 15 is stationary held at the withdrawn position as shown in FIG. 2. The shape of the stopper 23 is such that when the slider 15 is pushed leftward, as seen in FIG. 2, the downward projection 23' smoothly comes out of the notch 18' without presenting any material resistance against the movement of the slider 15.

Figure 3:
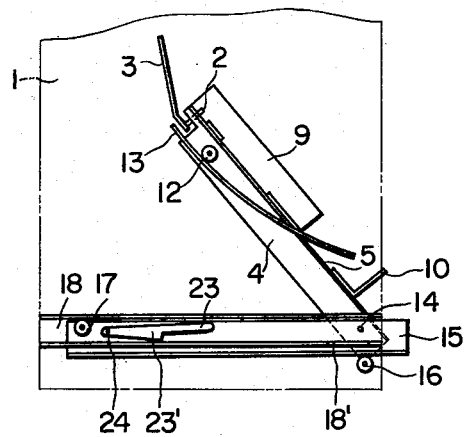
FIG. 3 is a view, similar to FIG. 2, illustrating the copying paper storing board in the state as set in position within the copying machine.

As the slider 15 is pushed leftward into the copying machine, the rollers 12 at the upper end of the holder 4 rotate along the holder guide plates 13, so as to move upwards. When the slider 15 reaches a predetermined pushed-in or operative position, as shown in FIG. 3, the notches 5' of the storing board 5 and the notches 4' of the holder 4 come into engagement with the pins 2 on the copying paper guide plate 3, and at the same time the lock claw 20 engages with the notch 18" of the guide channel 18, as described above, to hold the slider 15 at the thus pushed-in position. The gravity acting on various parts of the holder 4 and the slider 15 tends to urge the slider rightward, as seen in FIG. 3. As a result of it, upon raising the elongated portion 20' of the claw 20, the claw 20 is disengaged from the notch 18" to allow automatic movement of the slider 15 to the right or out of the copying machine. As soon as the slider 15 comes to the withdrawn position, as shown in FIG. 2, the projection 23' of the stopper 23 engages with the other notch 18' of the channel member 18 to automatically stop the slider.

When the slider 15 as at the withdrawn position, if the stopper 23 is manually raised and the slider 15 is pulled rightward, the slider 15 itself and other members connected thereto can be easily separated from the copying machine. Thus, the copying paper storing board 5 can be taken to any place convenient for working on it, such as loading additional copying paper or replacing the old copying paper with those of different size.

After loading the copying paper on the storing board 5, it can be mounted on the holder 4, and the slider with the thus loaded storing board 5 can be easily moved into the copying machine to the operative position, as shown in FIG. 3.

To simplify the process of replacing the copying paper on the storing board with those of different size, it is possible to prepare separately a number of storing boards 5 having different size copying papers mounted thereon, respectively, with the indexing plates 8, 9, 10 properly positioned accordingly, so that the change of the size of the copying paper can be carried out simply by replacing the storing board on the holder with the desired one of the storing boards thus prepared. Thus, the time necessary for removing old copying paper from the storing board 5 and loading new copying paper thereon can be saved.

In the particular embodiment illustrated in the figures, a separate holder is used to carry a copying paper storing board in a replaceable manner, however, it is apparent to those skilled in the art that such holder can be made integral with the copying paper storing board.

As described in the foregoing, according to the present invention, a copying mahcine with a copying paper storing means is provided, which storing means can be automatically withdrawn to a certain position outside of the copying machine simply by releasing a locking claw, and can be moved back to an operative position within the copying machine simply by manually pushing it toward the machine, and automatically locked at the operative position by the claw. Thus, the process for loading and replacing the copying paper is considerably simplified. Furthermore, the copying paper storing means can be easily removed from the copying machine by manually releasing a stopper. With such construction, the assembling and disassembling process of the copying machine is noticeably improved.

Figure 4:
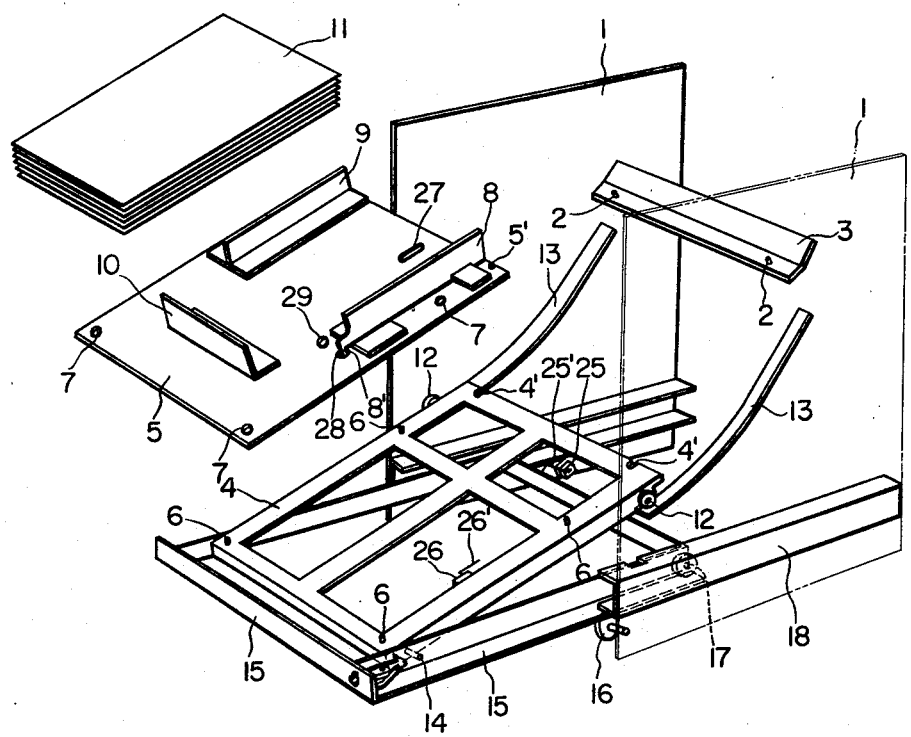
FIG. 4 is an exploded perspective view of a copying paper storing means, including an indicator to show the size of the copying paper stored therein, usable in the copying machine according to the present invention.
Figure 5:
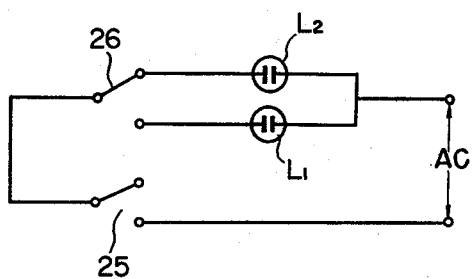
FIG. 5 is a circuit diagram of the indicator.
Figure 6:
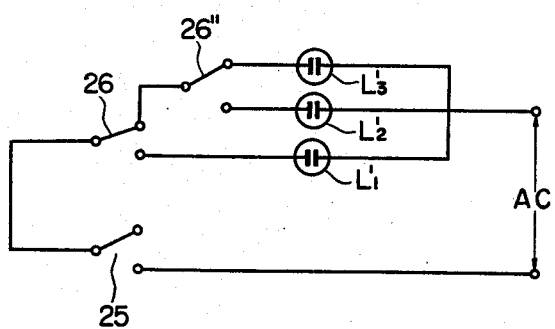
FIG. 6 is a diagram of a different electric circuit to be adopted in the indicator.

FIGS. 4 to 6 illustrate another embodiment of the present invention, in which microswitches are used to detect and indicate the size of copying paper carried by a copying paper storing board or a holder thereof. Referring to FIG. 4, a holder 4 for carrying a copying paper storing board 5 has a pair of microswitches 25, 26 secured thereto. An actuator 25' of the microswitch 25 penetrates through a hole 27 bored on the copying paper storing board 5 so as to come into direct contact with the copying paper on the board 5, so that the existence and non-existence of the copying paper on the storing board 5 can be detected by the operative conditions, i.e. ON or OFF, of the microswitch 25. An actuator 26' of the other microswitch 26 is fitted in a hole 28 bored on the storing board 5. When an indexing plate having a boss 8' fits in the hole 28, the actuator 26' is depressed by the boss 8' and the microswitch is turned ON. On the other hand, when the indexing plate 8 is at another position with the boss 8' fitted in another hole 29 bored on the board 5, the actuator 26' is not depressed by the boss 8', to turn OFF the microswitch 26.

As shown in FIG. 5, the microswitches 25, 26 are connected to indicator lamps $L_1$, $L_2$ mounted on suitable portion, such as front panel, of the copying machine. In this particular embodiment, as shown in FIG. 5, there is no copying paper stored on the board 5, both indicator lamps $L_1$ and $L_2$ are deenergized, because the microswitch 25 is turned OFF. On the other hand, if there is a certain amount of copying paper stored on the board 5, either the lamp $L_1$ or the lamp $L_2$ is lit, depending on whether the boss 8' of the indexing plate 8 is in the hole 28 or 29, namely depending on the size of paper on the board 5 which is indexed by the indexing plate 8.

The copying paper storing board of FIG. 4 is designed for handling copying papers of two different sizes. It is, however, easily modifiable for handling copying papers of three different sizes by using three microswitches 25, 26, 26", which are connected as shown in FIG. 6, so as to indicate which one of the three sizes is being used by energizing a corresponding indicator lamp $L_1'$, $L_2'$, or $L_3'$.

In the example of FIG. 4, the microswitch 26 is actuated by the boss 8' integrally formed on the indexing plate 8, but the present invention is not restricted to such arrangement alone, and any other suitable means variable responsive to the size of the copying paper placed on the storing board 5 can be used for actuating the microswitch. For instance, if the indexing plate 8 is such type that it is fastened to the storing board by screws, the actuator of the microswitch can be so modified as to be actuated by the position of such fastening screws, or by the operative conditions of the screws per se.

In the embodiment of FIG. 4, the storing board 5 can be moved to the outside of the copying machine for loading and replacing the copying paper 11 thereon, simply by withdrawing a slider 15 together with a holder 4, as in the case of the preceding embodiment. The storing board 5 can be moved to a ready for operation position by pushing the slider 15 to the operating position, and the position of the copying paper is registered by the engagement of notches 4' and 5' of the storing board and the holder with the corresponding pins 2 on a copying paper guide plate 3.

As described in the foregoing, according to the present invention, the size of each copying paper can be indicated by indicator lamps, and when the size of the copying paper is changed, the indicator lamps are also changed automatically to indicate the correct size of the copying paper being available in the copying machine. Similarly, the non-existence of the copying paper on the storing board can be indicated by the indicator lamp either before the beginning of or during the copying operation. Thus, automatic copying operation can be carried out efficiently without causing any misuse of the copying paper size.

Although the present invention has been described with a certain degree of particularity, it is understood that the present disclosure has been made only by way of example and that numerous changes in the details of construction and the combination and arrangement of parts may be resorted to without departing from the spirit and the scope of the present invention.

What is claimed is:

1. A copying machine having a movable copying paper storing means, comprising a slider movable between an operative position and a withdrawn position, a locking means mounted on said slider and engageable with copying machine housing when said slider is at said operating position for locking the slider there, a stopper carried by said slider and engageable with said housing when said slider is moved to said withdrawn position for stopping the slider at the withdrawn position, and a copying paper storing means pivotally connected to said slider, said slider and said storing means being adapted to move automatically from said operating position toward said withdrawn position by gravity upon release of said locking means.

2. A copying machine according to claim 1, wherein said copying paper storing means includes a copying paper storing board and a holder of said copying paper storing board in a removable manner, said holder being pivotally connected to said slider.

3. A copying machine according to claim 1, wherein said slider is removable from the copying machine body by releasing said stopper.

4. A copying machine according to claim 1 and further comprising a first switch mounted on said copying paper storing means and having a first actuator engageable only with copying paper stored on the copying paper storing means, said first switch being adapted to be turned off when said first actuator is not engaged with the copying paper, an indexing means mounted on the copying paper storing means to index the position of the copying paper for different sizes thereof by occupying different indexing positions for each size of the copying paper, a second switch means having second actuators associated with each indexing position of said indexing means, said second switch having contacts, each associated with each of said second actuator so as to be closed when said indexing means occupies the corresponding indexing position by means of the corresponding second actuator, a first lamp associated with said first switch, and second lamp means including at least one lamp, associated with one of said second switch means contacts, whereby non-existence of the copying paper on said copying paper storing means is indicated by said first lamp and the size of the copying paper is indicated by said first lamp and said second lamp means.

References Cited

UNITED STATES PATENTS 2,912,293  11/1959  Jung _____ 312—29

FOREIGN PATENTS 810,178  8/1951  Germany.

RICHARD E. AEGERTER, Primary Examiner

U.S. Cl. X.R,

312—29, 307